United States Patent Office 3,637,672
Patented Jan. 25, 1972

3,637,672
AZOLE COMPOUNDS
Shuichi Seino, Osaka, Tomizo Fujino, Suita-sha, and Kakuji Tonegawa, Kyoto, Japan, assignors to Osaka Seika Kogyo Kabushiki Kaisha, Osaka, and Nippon Kayaku Kabushiki Kaisha, Tokyo, Japan
No Drawing. Filed July 9, 1968, Ser. No. 743,303
Int. Cl. C09b 23/14
U.S. Cl. 260—240.9
9 Claims

ABSTRACT OF THE DISCLOSURE

Azole compounds useful for fluorescent brightening agents for synthetic fibers, such as

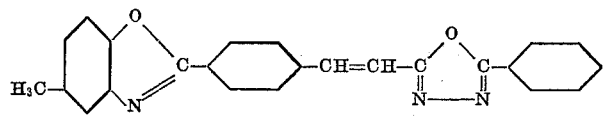

The compound is prepared by heating

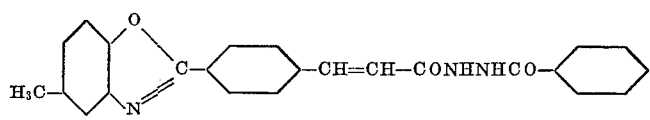

with a dehydrating agent of thionyl chloride in order to cause ring formation.

---

The present invention relates to azole compounds represented by general Formula 1 depicted below and a process for producing the same.

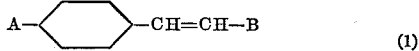

wherein A is

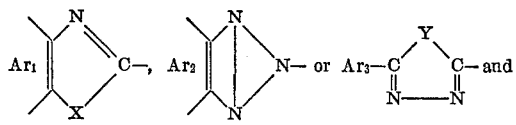

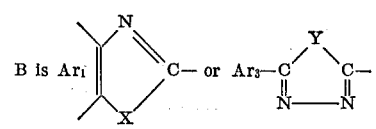

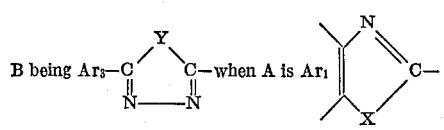

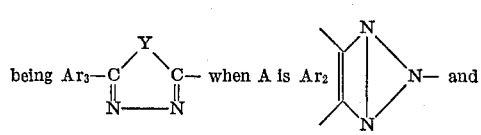

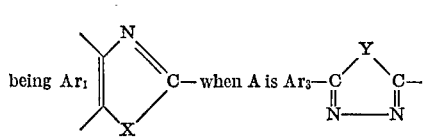

$Ar_1$ is substituted or non-substituted benzene or naphthalene nucleus,
$Ar_2$ is substituted or non-substituted benzene, naphthalene, acenaphthene or pyrazole nucleus,
$Ar_3$ is substituted or non-substituted benzene, naphthalene, pyridine or quinoline nucleus,
X is oxygen, sulfur, NH group or N-alkyl group and
Y is oxygen or sulfur.

The azole compounds of the present invention are used as fluorescent brightening agents for organic materials, particularly such synthetic fibres as polyester, polyamide, cellulose acetate, polyacrylonitrile, polyolefin and polyvinyl alcohol, and such synthetic resins as polyvinyl chloride, polystyrene, polyacrylonitrile, polyamide, polycarbonate and urea resin.

The substituents of $Ar_1$, $Ar_2$ and $Ar_3$ in general Formula 1 are generally preferred to be stable and inactive, and can be selected from a wide range. Illustrative of these substituents includes, for example, hydrogen, alkyl, alkoxy, halogen, phenyl, amino, substituted amino carboxyl, carboalkoxy, carboaryloxy, sulfonic acid, alkylsulfonyl, arylsulfonyl, sulfamyl, alkylsulfamyl and dialkylsulfamyl.

Various methods can be thought of for producing the compounds of general Formula 1, but the following methods are preferred.

(1)

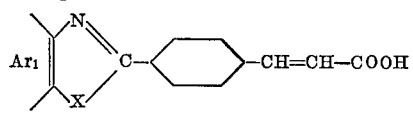

is treated in a known manner with a hologenating compound, such as thionyl chloride, phosphorus trichloride, phosphorus pentachloride, phosphorus oxychloride, thionyl bromide or phosphorus pentabromide, to give the corresponding halogenide and the halogenide thus produced is treated with aqueous hydrazine to give a compound of the following formula:

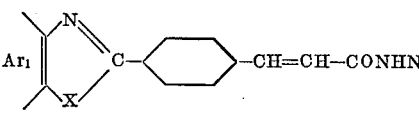

1 mol of the compound of Formula 2 is reacted with 1 mol of a compound of the formula $Ar_3$—COCl in an inert solvent in the presence of a hydrogen chloride-removing compound, such as pyridine, pycoline or trialkylamine, to obtain a compound represented by the formula:

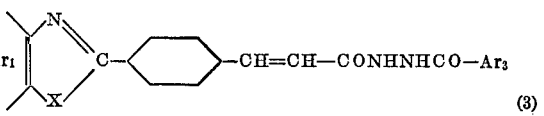

The compound thus obtained is heated in a suitable organic solvent, e.g. chlorobenzene, with a dehydrating agent, such as thionyl chloride, phosphorus oxychloride, phosphorus trichloride, zinc chloride, phosphoric acid or polyphosphoric acid, or with phosphorus pentasulfide for closing the ring and a compound of the following formula is obtained.

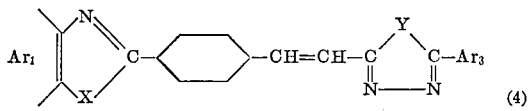
(4)

In this case, use of dehydrant will result in a compound of Formula 4 wherein Y is oxygen, while use of phosphorus pentasulfide will result in a compound of Formula 4 wherein Y is sulfur.

(2) A compound of the following formula:

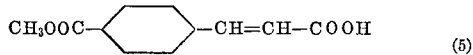
(5)

is treated with a halogenating compound, such as thionyl chloride, in the usual manner to give the corresponding halogenide, which is then reacted with a compound represented by the formula Ar₃—CONHNH₂ in the presence of a hydrogen halogenide-removing agent, such as pyridine, to give a compound represented by the formula:

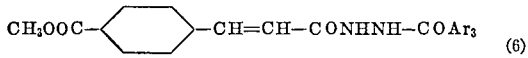
(6)

Then, the compound of Formula 6 is heated with the dehydrating agent or phosphorus pentasulfide, as used in method 1, to close the ring and a compound of the following formula is obtained.

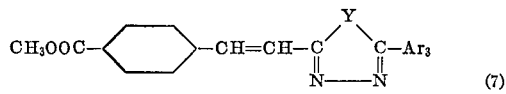
(7)

In this case, use of the dehydrating agent will result in a compound of Formula 7 wherein Y is oxygen, while use of phosphorus pentasulfide will result in a compound of Formula 7 wherein Y is sulfur.

The compound of general Formula 7 is heated in alcoholic caustic potash or alcoholic caustic soda and neutralized with hydrochloric acid to produce the corresponding carboxylic acid of the formula:

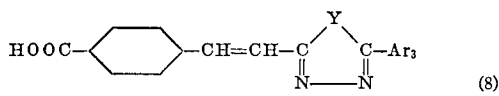
(8)

The carboxylic acid thus obtained is reacted with a halogenating compound, such as thionyl chloride, to give the corresponding halogenide, which is then reacted with a compound of the formula:

(9)

(XH or NH₂ group is at ortho position to each other) to obtain a compound of the formula:

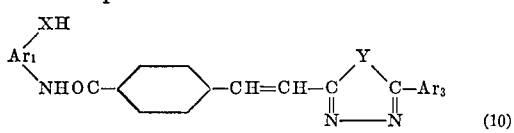
(10)

Finally, the compound of Formula 10 is subjected to a dehydrating and ring-closing treatment and a compound of the formula:

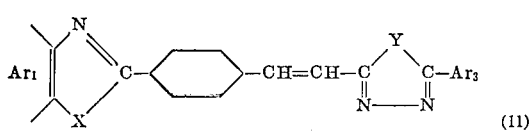
(11)

is obtained.

The compound of Formula 11 can be obtained merely by heating the compound of Formula 10 but since the reaction does not proceed homogeneously it is preferable to use an organic solvent, such as toluene, xylene, dichlorobenzene or trichlorobenzene, to carry out the reaction in a homogeneous state.

In order to promote the reaction, a small amount of dehydrating catalyst, such as boric acid, p-toluene sulfonic acid or zinc chloride, is preferably used. The dehydrating and ring-closing temperature is preferably normally from 110° to 250° C. The compound of Formula 11, that is, the reaction product, may be recrystallized from such an organic solvent as dichlorobenzene or cyclohexanone, as required.

A compound of Formula 11 wherein X is N-alkyl, can be obtained by treating a compound of Formula 11 wherein X is NH with an alkylating agent, e.g. dimethyl sulphate, alkyl halide or p-toluene sulfonic acid alkyl ester, in alcoholic caustic alkali.

(3) A compound of the formula:

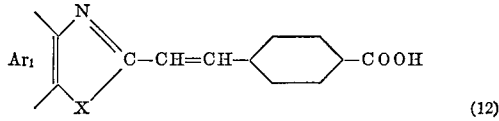
(12)

is treated with a halogenating agent, such as thionyl chloride, phosphorus trichloride, phosphorus pentachloride, phosphorus oxychloride, thionyl bromide or phosphorus pentabromide, in the usual manner to give the corresponding halogenide, which is then treated with aqueous solution of hydrazine to obtain a compound of the following formula:

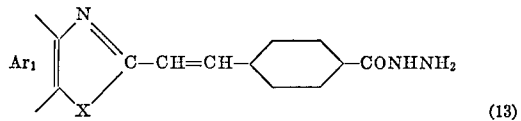
(13)

One mol of the compound of Formula 13 is reacted with 1 mol of a compound represented by the formula Ar₃—COCl in an inert solvent in the presence of hydrogen chloride-removing agent, such as pyridine, and a compound of the formula:

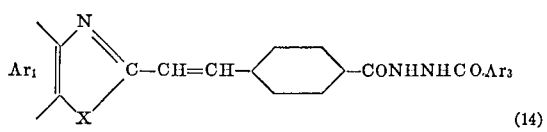
(14)

is obtained. The compound thus obtained is heated with the dehydrating agent or phosphorus pentasulfide as used in method 1, in an organic solvent, e.g. chlorobenzene, to close the ring and a compound of the following formula is obtained.

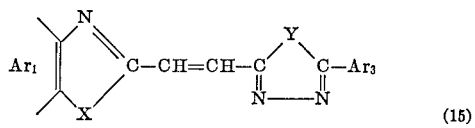
(15)

In this case, a compound of Formula 15 wherein Y is oxygen is obtained when dehydrating agent is used, while a compound of Formula 15 wherein Y is sulfur is obtained when phosphorus pentasulfide is used.

The ring-closing temperature in this method is preferably usually from 100 to 250° C. In this case, a better yield can be obtained by the use of an organic solvent, such as toluene, xylene, dichlorobenzene or trichlorobenzene, in order to avoid unhomogeneous reaction. If desired, the reaction product of Formula 15 may be recrystallized from an organic solvent, such as xylene, dichlorobenzene or cyclohexanone.

(4) A carboxylic acid represented by the following formula is treated with a halogenating agent to give the corresponding halogenide.

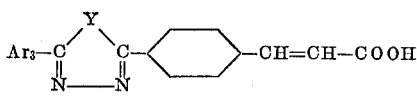

The thus obtained halogenide is reacted with an amino compound of the formula:

to obtain a compound represented by the formula:

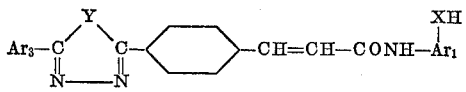

Upon dehydrating and closing the ring of the compound of Formula 18, a compound of Formula 19 is obtained.

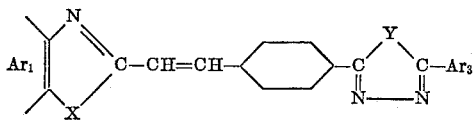

The compound of Formula 16 can be produced by the following two methods:

(A) A compound represented by the formula:

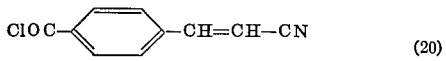

and a hydrazide compound represented by the formula:

$$Ar_3—CONHNH_2 \quad (21)$$

are condensed by removing hydrogen chloride, or cinnamonitrile-4-carboxylic acid hydrazide represented by the formula

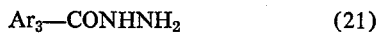

and carboxylic acid chloride represented by the formula $Ar_3$—COCl are condensed by removing hydrogen halide, to obtain a compound of the following formula:

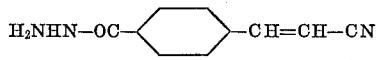

Then, the ring of the compound is closed and a compound of the formula:

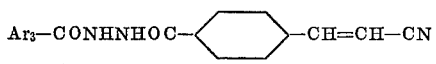

is obtained. Upon hydrolysis, the compound of Formula 16 is produced.

The cinnamonitrile-4-carboxylic acid chloride can be readily obtained by acting chlorinating agent on cinnamonitrile-4-carboxylic acid which can be produced by the Meerwein reaction from p-aminobenzoic acid diazonium salt and acrylonitrile through α-chlorohydrocinnamonitrile-4-carboxylic acid.

(B) The compound of Formula 16 is produced by the Meerwein reaction between diazonium salt, obtained by diazotizing a compound of the formula:

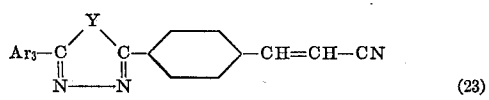

and acrylonitrile or α,β-unsaturated carboxylic acid, i.e. acrylic acid, fumaric acid, maleic acid or maleic anhydride, wherein when the acrylonitrile is used, the product is the following compound of Formula 25 from which hydrogen chloride is removed to obtain the compound of Formula 23 which nitrile group is hydrolyzed to obtain the compound of Formula 16.

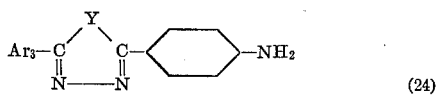

(5) An amino compound represented by the formula:

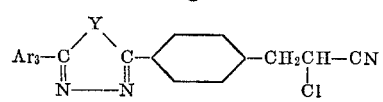

is diazotized and the resultant compound is coupled with amino compound which is represented by the formula:

$$H_2N—Ar_2 \quad (27)$$

and which can be coupled at the ortho-position of amino group, to obtain a compound of the formula:

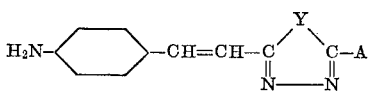

Then, the compound of Formula 28 is oxidized with oxidizing agent, such as sodium hypochlorite, copper sulfate-ammonia aqueous solution or copper sulfate-pyridine solution, to give a compound of the formula:

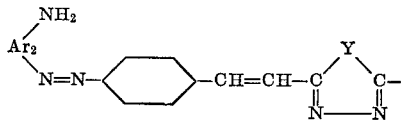

Compounds of Formula 27 include β-naphthylamines, 5-aminoacenaphthenes, aminopyrazoles, m - phenylenediamines and 4-amino-2-methoxy(ethoxy)toluene.

The manner in which the azole compounds of the present invention are applied to organic materials, is variable depending upon the characteristics of the azole compound used and the type of the organic material to which said azole compound is applied. For dyeing synthetic fibres with an azole type compound which is hard-soluble in water, a known dyeing method is employed. Namely, an aqueous dispersion of azole compound is prepared by the use of a suitable surface active agent, e.g. polyoxyethylene ether-type non-ionic surface active agent or alkylbenzene sulfonic acid-type anionic surface active agent, and the fibres are dipped in said dispersion for brightening. In this case, the treatment temperature is preferably normally in the neighbourhood of 50 to 130° C. in accordance with the fibre materials. As for polyester-type synthetic fibres, the brightening effect may further be improved by adding in the treatment bath a dyeing assistant, such as trichlorobenzene or methyl salicylate. In treating fabrics made of polyester-type synthetic fibre or mixture thereof with cotton, it is preferable to subject the fibres to a hot air treatment according to the so-called pigment padding method. The temperature of 160 to 200° C. is preferably used for such treatment.

As the other method of treating synthetic fibres, the azole compounds of the present invention may be added in the polymers before said polymers are spun into the fibres.

Of the azole compounds of the present invention, those which are soluble in water, e.g. those compounds having sulfonic acid group, are used by the dyeing method which is adapted for use with acid dies and direct cotton dyes. The compounds of this type are used for natural fibres, such as cotton, wool and silk, and polyamide fibres.

The amount of the azole compounds used in the brightening treatment so far described is preferably selected normally in the range of 0.01 to 0.4% with respect to the amount of the fibre materials.

In use of the azole compounds of the present invention for the brightening treatment of synthetic resins, it is advantageous, for example, to mixing the azole compound with the polymer before shaping and then shape the mixture by heat-treating it with a previously heated roll.

The temperature in this case is preferably from 130 to 300° C. and the amount of the azole compound used is preferably normally from 0.005 to 2.0%.

EXAMPLE 1

From the Meerwein reaction between the compound, obtained by diazotization of p-aminobenzoic acid, and acrylonitrile, trans-p-carboxycinnamonitrile was synthesized. 27.7 g. of p-carboxycinnamonitrile was heated with 200 cc. of chlorobenzene and 18.7 g. of thionyl chloride while stirring the mixture, until the generation of hydrochloric acid gas stops at the boiling point. Thereafter, 17.6 g. of 4-methyl-2-aminophenol and 14.7 g. of pyridine were added and the mixture was heated to the boiling point for 6 hours. Upon cooling, the precipitate was separated and 30 g. of a compound represented by the following formula was obtained.

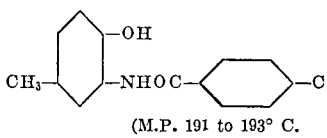

(M.P. 191 to 193° C.

20 g. of the compound was heated in a mixture of 130 cc. of xylene and 0.5 g. of p-toluene sulfonic acid, for 15 hours at the boiling point with stirring while removing the water generated from the system and, after cooling, the prepipitate was separated. A compound of the following formula was obtained.

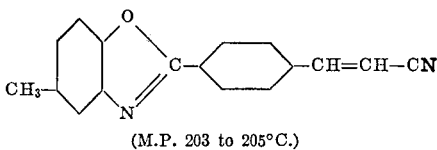

(M.P. 203 to 205°C.)

8 g. of the above compound was heated in 100 g. of 70% sulfuric acid at 110° C. for 8 hours, and then the mixture was poured into a large amount of ice-water. Upon separating the precipitate, 8 g. of a compound of the following formula was obtained.

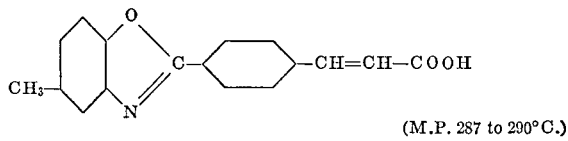

(M.P. 287 to 290°C.)

8 g. of the compound was heated in a mixture of 150 cc. of xylene and 4.1 g. of thionyl chloride, with stirring until the generation of hydrochloric acid gas stopped, and after vaporizing the xylene, the residue was recrystallized from xylene. 6 g. of a compound of the formula:

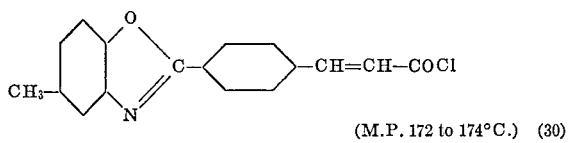

(M.P. 172 to 174°C.) (30)

was obtained.

5.4 g. of the chloride thus obtained was added in 35 g. of 5% aqueous solution of hydrazine with stirring at a temperature not higher than 20° C. and after carrying out the reaction for 1 hour at said temperature, the temperature was elevated slowly to 90° C. Upon cooling and filtering, 5.0 g. of a compound of the following formula was obtained.

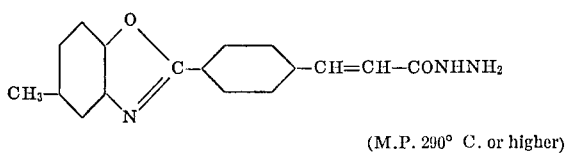

(M.P. 290° C. or higher)

5 g. of the compound was treated with 100 cc. of xylene, 2 g. of pyridine and 3.11 g. of benzoyl chloride for 5 hours at the boiling point and after cooling the precipitate was separated. A compound of the formula:

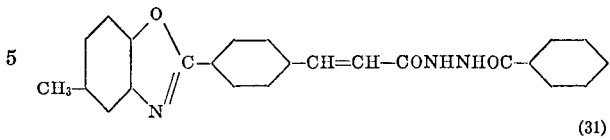

(31)

was obtained in the yield of 5.5 g.

Then, 2.5 g. of the compound was reacted in 50 cc. of xylene and 2.33 g. of thionyl chloride for 8 hours at the boiling point, and the mixture was filtered while it was hot, with the aid of decolorizing carbon. Upon cooling the filtrate, a compound ($F_{max.}$ 409 m$\mu$) of the formula:

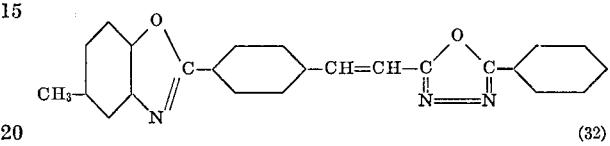

(32)

Measurement (percent): C, 75.91; N, 11.13. Calculation (percent): C, 75.97; N, 11.08 was obtained in the yield of 1.8 g.

When the reaction was carried out using phosphorus pentachloride, instead of thionyl chloride, a light yellowish crystal of a compound ($F_{max.}$ 419 m$\mu$) of the formula:

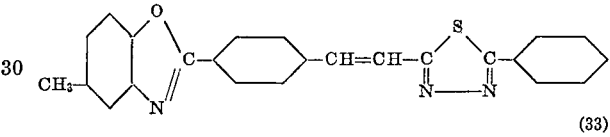

(33)

Measurement (percent): C, 72.81; N, 1070. Calculation (percent): C, 72.89; N, 10.62 was obtained.

The values of $F_{max.}$ were measured with 0.000025 g./l. dioxane solution.

EXAMPLES 2 TO 5

The process as described in Example 1 was repeated using the compounds depicted in column I of Table I below, instead of the compound of Formula 30, the compounds depicted in Column II of said table instead of benzoyl chloride and the compounds depicted in Column III of said table instead of thionyl chloride, and the compounds depicted in Column IV of said table were obtained (see Table I below).

EXAMPLE 6

10.3 g. of a compound represented by the formula:

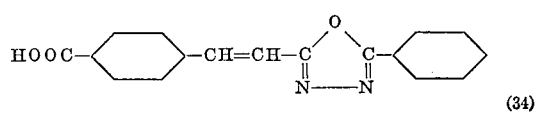

(34)

was stirred in 200 cc. of toluene and 5.6 g. of thionyl chloride at the boiling point (110 to 112° C.) until the generation of hydrochloric acid gas stopped, and 50 cc. of toluene was distilled out to remove excess thionyl chloride. After cooling to 50° C. or below, 4.9 g. of cresamine was added to the residue while stirring vigorously and the reaction was carried out for 10 hours at the boiling point. After cooling, the crystal precipitated was separated, washed with water and dried. A compound represented by the formula:

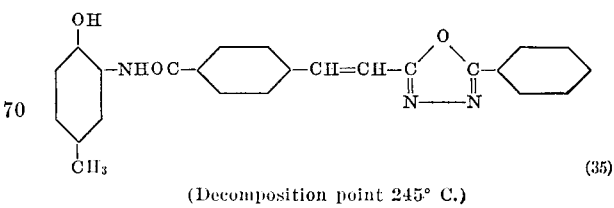

(35)

(Decomposition point 245° C.)

was obtained in the yield of 13.1 g.

Then, 13.1 g. of the carboxylic acid amide was boiled in 250 cc. of O-dichlorobenzene and 0.7 g. of boric acid for 6 hours, while removing the water, generated simultaneously with the reaction, from the reaction system, and after cooling 11.2 g. of a compound of the formula:

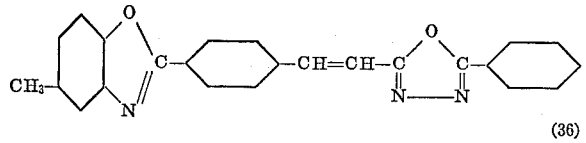
(36)

Analysis: C, 75.88%; N, 11.12%
Calculation: C, 75.97%; N, 11.08%
$F_{max.}$: 409 m$\mu$ (0.000025 g./l. dioxane)
was obtained in the form of a substantially pure yellow crystal.

The compound of Formula 34, the starting material in this example, is prepared in the following manner.

10.3 g. of p-carbomethoxy cinnamic acid and 200 cc. of xylene are charged, to which 7.2 g. of thionyl chloride is added at the normal temperature. The temperature is elevated to the boiling point in 1 hour and the mixture is stirred for 4 hours at said temperature to accomplish the chlorination. After purging 50 cc. of xylene to remove excess thionyl chloride, 7.5 g. of benzhydrazide and 5.2 g. of pyridine are added with vigorous stirring and the reaction was carried out for 6 hours at the boiling point. By cooling the mixture and separating the crystal precipitated, 14.5 g. of N - benzoyl-N'-(p-carbomethoxycinnamoyl) hydrazine (M.P. 226 to 228° C.) is obtained.

14.5 g. of the hydrazine thus obtained is reacted in 150 cc. of xylene and 10.6 g. of thionyl chloride at the boiling point until the generation of hydrochloric acid stops, whereby a transparent solution is obtained. Upon cooling, the crystal precipitated is separated by filtering, washed with a small amount of alcohol and dried. 2-(p-carbomethoxystyryl)-5-phenyloxadiazole (1,3,4) (M.P. 153.5 to 154.5° C.) is obtained at a yield of 12.0 g.

The compound thus obtained is boiled in 360 cc. of alcohol containing 2.8 g. of caustic potash for 6 hours, and the precipitated crystal is separated by filtering and dissolved in water. After rendering the aqueous solution acidic with hydrochloric acid, the precipitated white crystal is separated by filtering, washed with water and dried (M.P. 291 to 292° C.)

EXAMPLES 7–19

The process of Example 6 was repeated using the compounds depicted in Column I of Table II below instead of the compound of Formula 34, the compounds depicted in Column II of said table instead of 4-methyl-2-aminophenol and the compounds depicted in Column III of said table instead of thionyl chloride, and the compounds depicted in Column IV of said table were obtained respectively. (See Table II below).

EXAMPLE 20

8.7 g. of a compound represented by the formula

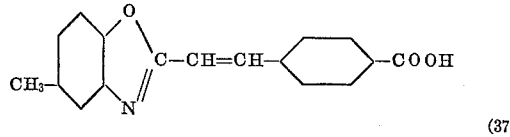
(37)

was stirred in 200 cc. of toluene and 4.5 g. of thionyl chloride until the mixture stops generating hydrochloric acid gas and thereafter 50 cc. of toluene was distilled out to remove excess thionyl chloride. The residue was cooled to 50° C. or below, to which 4.7 g. of benzhydrazide and 3.2 g. of pyridine were added with vigorous stirring and the reaction was carried out for 6 hours at the boiling point (110° C.). Upon cooling, the precipitated crystal was separated, washed with water and dried. 12.0 g. of a compound represented by the formula

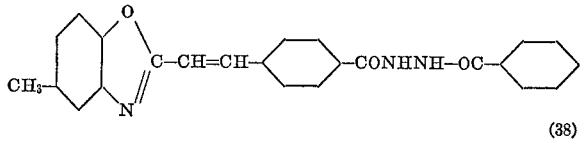
(38)

was obtained.

This compound was reacted with 240 cc. of xylene and 7.2 g. of thionyl chloride at the boiling point (140° C.) until the mixture becomes transparent and stops generating hydrochloric acid gas. After cooling the mixture, 10.3 g. of a compound represented by the formula

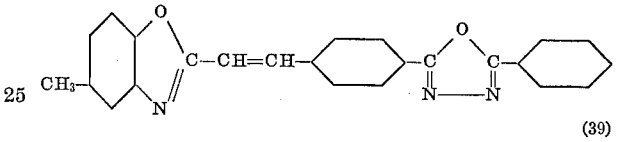
(39)

was obtained in the form of a light yellow crystal.
This compound emits a bluish purple fluorescence in dioxane.

$F_{max.}$: 416 m$\mu$ (0.000025 g./l. dioxane)
Analysis: C, 75.90%; N, 11.12%
Calculation: C, 75.97%; N, 11.08%

When the ring of the compound of Formula 38 is closed by removing water therefrom, using 10 g. of phosphorus pentasulfide instead of of thionyl chloride, a compound of the formula

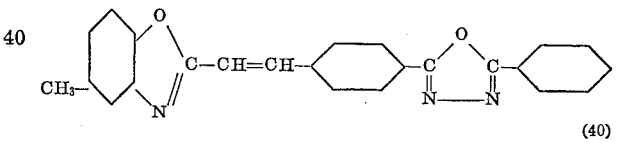
(40)

was obtained.
Analysis: C, 72.78%; N, 10.70%
Calculation: C, 72.89%; N, 10.63%
$F_{max.}$: 423 m$\mu$

EXAMPLES 21 TO 38

The process of Example 20 was repeated using the compounds depicted in Column I of Table III below instead of the compound of Formula 37, the compounds depicted in Column II of said table instead of benzhydrazide and the compounds depicted in Column III of said table instead of thionyl chloride, and the compounds depicted in Column IV of said table were obtained respectively. (See Table III below.)

EXAMPLE 39

10 g. of the compound of Formula 32 produced in Example 1 was added in 100 g. of 25% fuming sulfuric acid at a temperature not higher than 10° C. and the temperature of the reaction mixture was slowly elevated to 60° C. Upon completion of the reaction, the reaction mixture was poured into ice-water. The crystal precipitated was separated by filtering, washed with 20% salt water and dried. A compound of the formula

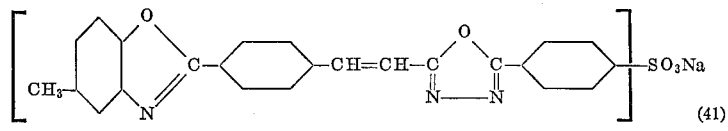
(41)

was obtained.

By operating the process in the same manner as described above using the compounds of Formulae 33 and 39 and the compounds obtained in Examples 22, 31 or 38, instead of the compound of Formula 32, the corresponding sulfonated compounds here obtained respectively.

EXAMPLE 40

16.8 g. of a compound represented by the formula

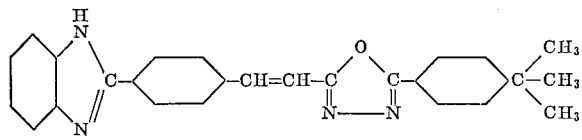

and 1.6 g. of sodium hydroxide were dissolved in 450 g. of 10% methyl Cellosolve solution, and after heating to 50° C. 7.4 g. of diethyl sulfuric acid was added and the temperature was slowly elevated to 100° C. The mixture was stirred for 1 hour at 100° C., cooled to room temperature and poured into water. Upon filtering, washing with water and drying, a compound represented by the formula

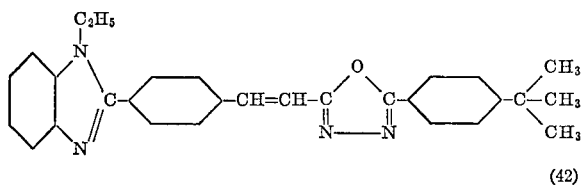

was obtained.
Analysis: C, 77.57%; N, 12.57%
Calculation: C, 77.65%; N, 12.49%
$F_{max}$. 435 m$\mu$ (0.000025 g./l. dioxane)

EXAMPLE 41

10.3 g. of a compound represented by the formula

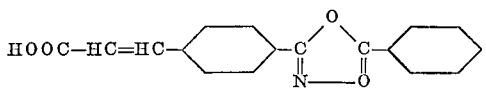

was stirred in 200 cc. of toluene and 5.6 g. of thionyl chloride at the boiling point with stirring until the mixture stops generating hydrochloric acid gas, and then 50 cc. of toluene was distilled out to remove excess thionyl chloride. After cooling the residue to room temperature, 4.9 g. of 4-methyl-2-aminophenol was added with stirring and the reaction was carried out for 4 hours at the boiling point. The mixture was cooled and the precipitate was filtered, washed with methanol and dried. About 13 g. of a compound of the formula

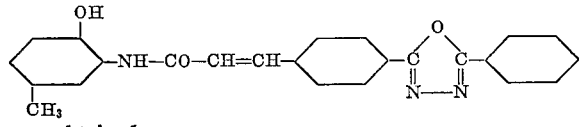

was obtained.
The 13 g. of carboxylic acid amide thus obtained was boiled in 200 cc. of O-dichlorobenzene and 0.7 g. of boric acid for 6 hours while removing the water generated from the reaction system. After cooling, the precipitate was filtered, washed with methanol and dried, whereupon about 10 g. of a compound of the formula

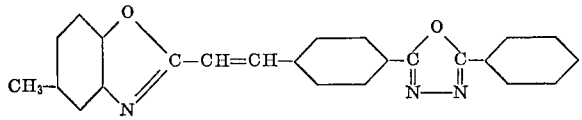

was obtained. By recrystallizing the compound thus obtained from O-dichlorobenzene, a light yellow crystal having a melting point of 241 to 243° C. was obtained.
Analysis: C, 75.93%; N, 11.10%
Calculation: C, 75.97%; N, 11.08%
$F_{max}$. 416 m$\mu$ (0.000025 g./l. dioxane)

The carboxylic acid compound used as the starting material in this example is prepared in the following manner.

A mixture of 9.6 g. of cinnamonitrile-4-carboxylic acid chloride, 6.8 g. of benzhydrazide and 8 g. of pyridine is elevated to 100° C. over a period of about 30 minutes in 100 cc. of chlorobenzene with stirring and the reaction was carried out for 2 hours at 100 to 110° C. After cooling, the precipitate is filtered and dried, and a compound of the formula

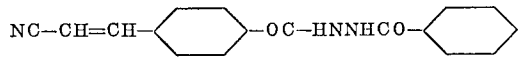

is obtained.
15 g. of the compound thus obtained is heated to 160° C. in 100 cc. of dichlorobenzene and 6 g. of thionyl chloride and the reaction is carried out until the mixture becomes completely dissolved. Upon cooling and filtering the resulting precipitate, a compound of the formula

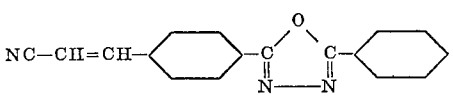

is obtained.
10 g. of this compound is reacted with 100 g. of 70% sulfuric acid for 8 hours at a temperature not lower than 100° C. and after cooling the mixture is poured into icewater and a compound of the formula

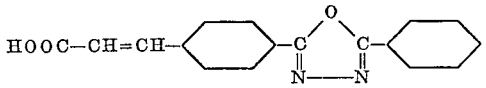

is obtained.

EXAMPLE 42

A mixture of 10.7 g. of a compound represented by the formula

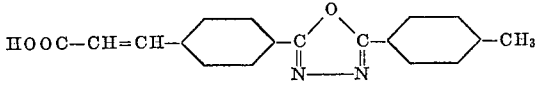

200 cc. of O-dichlorobenzene and 5.6 g. of thionyl chloride, was heated to 140 to 150° C. until it stops generating hydrochloric acid gas and excess thionyl chloride was removed by vacuum distillation along with 50 cc. of O-dichlorobenzene. 4.9 g. of 4-methyl-2-aminophenol was added to the residue and the reaction was carried out at 140 to 150° C. for 4 hours with stirring. 0.5 g. of p-toluene sulfonic acid was added to the carboxylic acid amide produced, without isolating the latter from the reaction system and the reaction was carried out at the boiling point while removing the water generated by distillation. After 4 hours of reaction, the mixture was cooled and the precipitate was filtered and washed with methanol. 12 g. of a compound of the formula

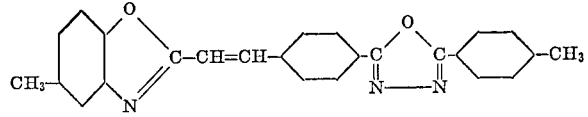

was obtained.
By recrystallizing the compound from O-dichlorobenzene, a light yellow crystal having a melting point of 264 to 265° C. was obtained.
Analysis: C, 76.29%; N, 10.70%
Calculation: C, 76.32%; N, 10.68%
$F_{max}$.: 418 m$\mu$ (0.000025 g./l. dioxane)

The starting material in this example, that is, carboxylic acid compound, may be prepared in the same manner as described in Example 41, using p-methyl benzhydrazide instead of benzhydrazide. Alternatively, it may be prepared in the following manner.

25.1 g. of a compound of the formula

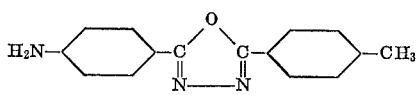

is diazotized in the usual manner and neutralized with sodium acetate. The resultant solution is poured into a mixture of 10.8 g. of maleic anhydride and 200 cc. of acetone at room temperature, to which is added a solution of 5 g. of cupric chloride in 20 cc. of water. The mixture is heated to 50° C. after the generation of nitrogen gas has stopped and diazonium salt has been dissipated. The reaction product is filtered and extracted with sodium carbonate, and after adding hydrochloric acid the precipitate is filtered to obtain a compound of the formula

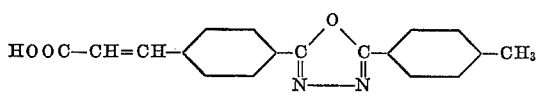

EXAMPLE 43

4.8 g. of p-nitrocinnamic acid was heated in 25 ml. of toluene and 4 g. of thionyl chloride until the generation of hydrochloric acid gas stops and then the mixture was cooled to obtain 4.8 g. of yellow precipitate of p-nitrocinnamic acid chloride. This compound was added to 35 ml. of 20% aqueous hydrazine at a temperature not higher than 3° C. and stirred for 1 or more hours. Thereafter, the mixture was elevated to 95° C. and the reaction was carried out for 30 minutes at said temperature. After cooling, the precipitated light yellow crystal was separated by filtering. 3.8 g. of a hydrazide compound of the formula

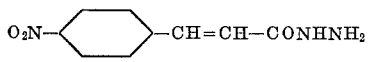 (43)

was obtained.

2.8 g. of the thus obtained hydrazide compound was suspended in a mixture of 1.7 g. of pyridine and 70 ml. of chlorobenzene, to which was added 2.84 g. of benzoyl chloride and, after boiling for 8 hours the reaction mixture was cooled to obtain 3 g. of yellow crystal of a compound of the formula

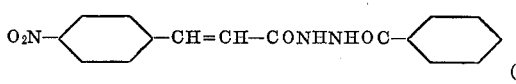 (44)

The 3 g. of the compound of the above formula was added to 11.4 g. of thionyl chloride and 200 ml. of chlorobenzene, and heated until the generation of hydrochloric acid stops, for closing the ring to form oxadiazole. Then, the mixture was concentrated until the content thereof is reduced to 30 ml. whereby 2.2 g. of a yellow crystal represented by the formula

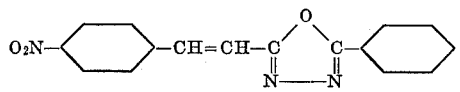 (45)

was recovered.
Analysis: C, 65.41%; H, 3.69%; N, 14.41%
Calculation: C, 65.52%; H, 3.78%; N, 14.33%

(based on $C_{16}H_{11}O_3N_3$)

2.2 g. of this nitro compound was stirred with 3 g. of iron powder in a mixture of 0.5 g. of concentrated hydrochloric acid, 20 ml. of water and 100 g. of ethylene glycol monomethyl ether for 20 hours and, after rendering the reaction mixture weakly alkaline with sodium carbonate the residual iron powder was removed by filtering and the filtrate was poured into a large amount of water. The solution was left to stand for a while and a light yellow crystal precipitated was recovered. 2 g. of a compound represented by the formula

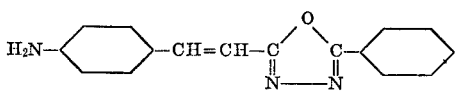 (46)

was obtained.

The 2 g. of amino compound of the above formula was diazotized in the usual manner and then added at a temperature not higher than 10° C. into 100 ml. of aqueous solution containing 1.1 g. of β-naphthylamine and 0.9 g. of 35% hydrochloric acid. The mixture was stirred for an extended period of time to obtain O-aminoazo compound. The O-aminoazo compound was dissolved with heat in a mixture of 60 ml. of pyridine and 0.1 g. of caustic soda, without drying the same, to which 12 g. of 10% sodium hypochlorite at a temperature in the neighborhood of 60° C. The mixture was stirred at said temperature for 2 or more hours and then cooled, whereby 1.8 g. of the objective compound represented by the formula

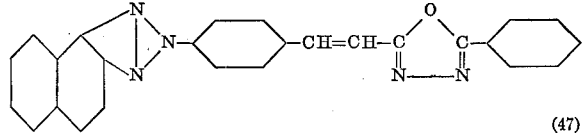 (47)

was obtained. For further purification, the compound was dissolved with heat in 80 ml. of O-xylene and, after adding thereto decolorizing agent, the solution was filtered and the filtrate was cooled, whereupon a greenish yellow beautiful crystal was obtained.
Analysis: C, 75.13%; H, 4.11%; N, 16.90%
Calculation: C, 75.16%; H, 4.12%; N, 16.86%

(based on $C_{26}H_{17}ON_5$)

EXAMPLES 44 TO 55

The process of Example 43 was repeated using the compounds depicted in Column I of Table IV instead of the compound of formula (46), and the compounds depicted in Column II of said table instead of β-naphthylamine, and the compounds depicted in Column III of said table were obtained respectively. (See Table IV below)

EXAMPLE 56

1 part of the compound represented by Formula 32 was thoroughly mixed with 99 parts of polyoxyethylene ether-type surface active agent to prepare a sample material. 1 part of said sample material per 10 parts of a Tetoron fabric was thrown into 300 parts of water containing 1.5 parts of chlorobenzene-type carrier, to obtain a dispersion. The Tetoron fabric was immersed in said dispersion at 100° C. for 60 minutes, and thereafter the Tetoron fabric thus treated was washed with water and dried. The Tetoron fabric showed a remarkable brightening effect as compared with untreated fabric.

Similarly, remarkably brightened fabrics were obtained by the use of the azole compounds produced in Examples 2, 3, 17 and 18.

EXAMPLE 57

A dispersion was prepared by dissolving 0.1 part of the compound represented by Formula 32 in 100 parts of dioxane with heat and pouring the resultant solution into a mixture of 12 parts of polyoxyethylene ether-type surface active agent and 3000 parts of water. 100 parts each of nylon, vinylon, acetate, polypropylene and cotton fabrics were individually immersed in the dispersion at 95° C. for 45 minutes. After washing the individual treated fabrics with water and drying, fabrics of bluish white color were obtained which were much brighter than untreated fabrics. The acetate fabric in particular gave a special brightness of purple color.

Similarly, excellent brightening effects were obtained by the use of azole compounds produced in Examples 37 and 38, instead of the compound of Formula 32.

EXAMPLE 58

A dispersion was prepared by dissolving 0.1 part of the compound represented by the formula

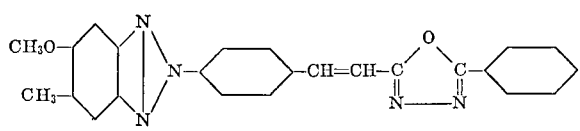

which was obtained in Example 43, in 100 parts of dioxane with heat and pouring the resultant solution into 3000 parts of water together with 12 parts of polyoxyethylene ether-type surface active agent. 100 parts of Tetoron fabric was immersed in this dispersion at 120° C. for 45 minutes. After washing the thus treated fabric with water and drying the same, a fabric was obtained which glistened in blue color with much more brightness than untreated fabric.

Similarly, excellent brightening effects were obtained by the use of the azole compounds produced in Examples 11, 12, 13, 14, 31, 32 and 45.

EXAMPLE 59

0.01 part of the compound represented by the formula

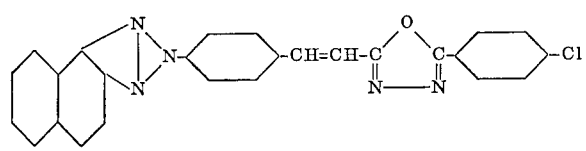

which was produced in Example 48, was mixed with 100 parts of polyethylene and the mixture was kneaded homogeneously on a roll heated to 130° C. and then pressed into a sheet, whereby a polyethylene sheet having a bright bluish fluorescence was obtained.

Similarly, excellent brightening effects were obtained by using the azole compounds produced in Examples 8, 16 and 37.

EXAMPLE 60

1 part of the compound represented by the formula

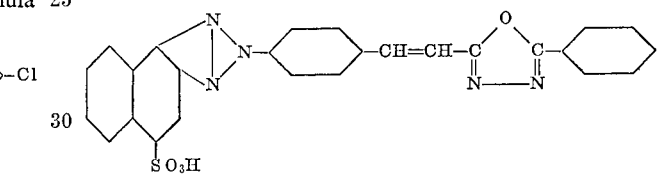

which was obtained in Example 44, was mixed with 9 parts of dioctyl phthalate to prepare a sample material. 0.1 part of the sample material was mixed with 100 parts of polyvinyl chloride, 0.2 part of titanium oxide and 3 parts of a tin-type stabilizer. After kneading with a roll previously heated to 170° C., the mixture was pressed into the shape of a sheet, whereby a polyvinyl chloride sheet having extremely high brightness was obtained.

EXAMPLE 61

100 parts of nylon fibre was dyed in a dyeing bath at 90° C. for 45 minutes, said dyeing bath (liquor ratio 1:30) containing 10 parts of Glauber's salt and 0.02 part of the dye represented by the formula which was produced in Example 50, and having the pH adjusted to 3 with acetic acid. The nylon fibre thus treated was washed with cold water and dried in air. The resultant dyed nylon fibre showed fluorescent-brightness which is much higher than that of undyed nylon fibre.

Similarly, excellent brightening effects were obtained by using the azole compounds produced in Examples 38, 51, 52, 53, 54 and 55.

TABLE I

| Ex. | I | II | III |
|---|---|---|---|
| 2 | | 4-methylbenzoyl chloride | Thionyl chloride. |
| 3 | | Benzoyl chloride | Phosphorus oxychloride. |
| 4 | | 4-methoxybenzoyl chloride. | Phosphorus trichloride. |
| 5 | Same as above | 4-chlorobenzoyl chloride | Do. |

| | | $F_{max.}$ (0.000025 g/l. dioxane), mμ | Elementary Analysis, percent | | | |
|---|---|---|---|---|---|---|
| | | | Observed | | Calc'd | |
| Ex. | IV | | C | N | C | N |
| 2 | | 414 | 76.25 | 10.77 | 76.32 | 10.68 |
| 3 | | 418 | 72.36 | 11.09 | 72.42 | 11.01 |

TABLE I—Continued

| Ex. IV | | $F_{max.}$ (0.000025 g/l. dioxane), mμ | Elementary Analysis, percent | | | |
|---|---|---|---|---|---|---|
| | | | Observed | | Calc'd | |
| | | | C | N | C | N |
| 4 | CH₃-[benzoxazole]-C₆H₄-CH=CH-[oxadiazole]-C₆H₄-OCH₃ | 414 | 73.28 | 10.34 | 73.33 | 10.26 |
| 5 | CH₃-[benzoxazole]-C₆H₄-CH=CH-[oxadiazole]-C₆H₄-Cl | 412 | 69.60 | 10.20 | 69.65 | 10.15 |

TABLE II

| Ex. | I | II | III |
|---|---|---|---|
| 7 | HOOC-C₆H₄-CH=CH-[oxadiazole]-C₆H₄-CH₃ | 4-methyl-2-aminophenol | Thionyl chloride. |
| 8 | HOOC-C₆H₄-CH=CH-[thiadiazole]-C₆H₅ | do | Do. |
| 9 | HOOC-C₆H₄-CH=CH-[oxadiazole]-C₆H₄-Cl | O-phenylenediamine | Phosphorus oxychloride. |
| 10 | HOOC-C₆H₄-CH=CH-[oxadiazole]-C₆H₄-OCH₃ | O-aminothiophenol | Do. |
| 11 | HOOC-C₆H₄-CH=CH-[oxadiazole]-pyridyl | O-aminophenol | Phosphorus trichloride. |
| 12 | HOOC-C₆H₄-CH=CH-[oxadiazole]-C₆H₅ | 2-amino-4-ethoxyphenol | Do. |
| 13 | HOOC-C₆H₄-CH=CH-[oxadiazole]-C₆H₅ | 4-chloro-2-aminophenol | Thionyl chloride. |
| 14 | HOOC-C₆H₄-CH=CH-[oxadiazole]-naphthyl | O-aminophenol | Do. |
| 15 | HOOC-C₆H₄-CH=CH-[oxadiazole]-C₆H₄(Cl) | 1-amino-2-naphthol | Do. |
| 16 | HOOC-C₆H₄-CH=CH-[oxadiazole]-C₆H₅ | 3-amino-4-hydroxydiphenyl | Do. |
| 17 | HOOC-C₆H₄-CH=CH-[oxadiazole]-C₆H₅ | 2-amino-4-carboethoxyphenol | Do. |
| 18 | HOOC-C₆H₄-CH=CH-[oxadiazole]-C₆H₄-CH₃ | 2-amino-4-ethylsulfonylphenol | Do. |
| 19 | HOOC-C₆H₄-CH=CH-[oxadiazole]-C₆H₄-C(CH₃)₃ | O-phenylenediamine | Do. |

TABLE II—Continued
| Ex. | IV | $F_{max.}$ (0.000025 g./ dioxane), mµ | Elementary analysis, percent | | | |
|---|---|---|---|---|---|---|
| | | | Observed | | Calc'd | |
| | | | C | N | C | N |
| 7 | | 411 | 76.28 | 10.60 | 76.32 | 10.68 |
| 8 | | 419 | 72.80 | 10.70 | 72.89 | 10.63 |
| 9 | | 420 | 69.21 | 14.12 | 69.27 | 14.05 |
| 10 | | 421 | 17.01 | 10.28 | 70.06 | 10.21 |
| 11 | | 413 | 72.08 | 15.25 | 72.12 | 15.29 |
| 12 | | 410 | 73.28 | 10.31 | 73.33 | 10.26 |
| 13 | | 408 | 69.00 | 10.60 | 69.00 | 10.51 |
| 14 | | 421 | 77.82 | 10.20 | 78.05 | 10.11 |
| 15 | | 425 | 72.09 | 9.04 | 72.08 | 9.34 |
| 16 | | 422 | 78.80 | 9.50 | 78.89 | 9.52 |
| 17 | | 411 | 71.31 | 3.68 | 71.38 | 9.61 |
| 18 | | 413 | 65.18 | 8.98 | 66.23 | 8.91 |
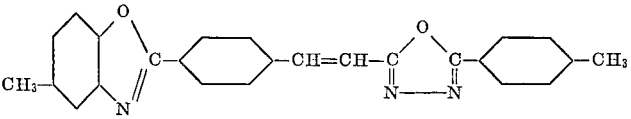
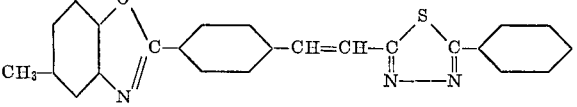
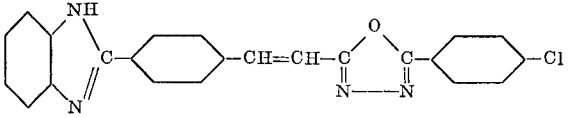
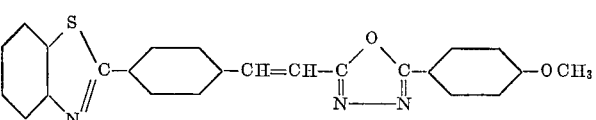
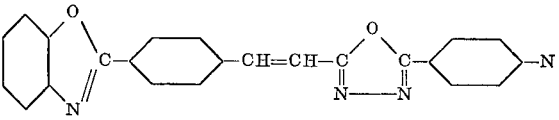
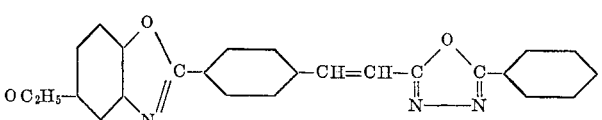
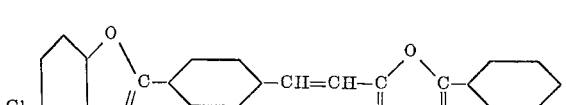
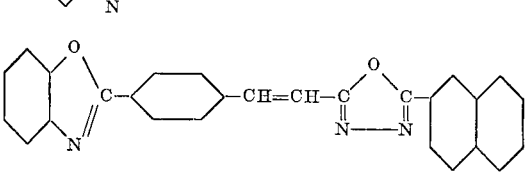
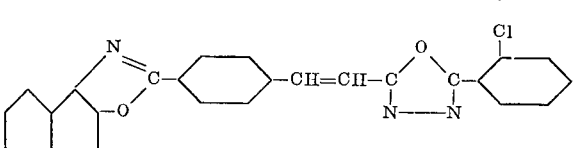
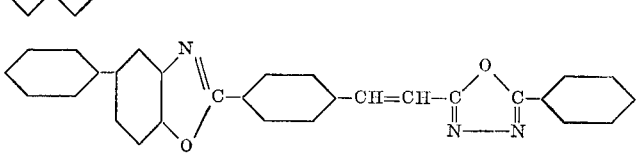
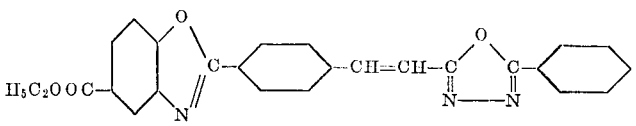
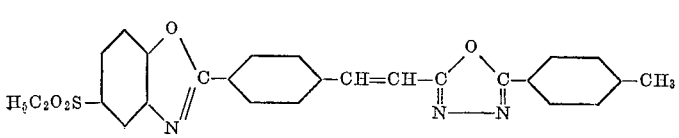

TABLE II—Continued

| Ex. | IV | $F_{max.}$ (0.000025 g/l. dioxane), m$\mu$ | Elementary Analysis, percent | | | |
|---|---|---|---|---|---|---|
| | | | Observed | | Calc'd | |
| | | | C | N | C | N |
| 19 | [benzimidazole-C-C₆H₄-CH=CH-C(oxadiazole)-C₆H₄-C(CH₃)₃] | 423 | 77.09 | 13.31 | 77.12 | 13.33 |

TABLE III

| Ex. | I | II | III |
|---|---|---|---|
| 21 | [benzoxazole-C-CH=CH-C₆H₄-COOH] | Benzhydrazide | Phosphorus oxychloride. |
| 22 | [benzimidazole-C-CH=CH-C₆H₄-COOH] | 2-chlorobenzhydrazide | Thionyl chloride. |
| 23 | [Cl-benzoxazole-C-CH=CH-C₆H₄-COOH] | Benzhydrazide | Phosphorus oxychloride. |
| 24 | [C₂H₅O-benzoxazole-C-CH=CH-C₆H₄-COOH] | ...do | Do. |
| 25 | [CH₃-benzoxazole-C-CH=CH-C₆H₄-COOH] | Nicotinic acid hydrazide | Thionyl chloride. |
| 26 | Same as above | β-naphthalic acid hydrazide | Do. |
| 27 | [benzoxazole-C-CH=CH-C₆H₄-COOH] | P-chlorobenzhydrazide | Polyphosphoric acid. |
| 28 | [naphth-oxazole-C-CH=CH-C₆H₄-COOH] | ...do | Do. |
| 29 | [naphth-oxazole-C-CH=CH-C₆H₄-COOH] | P-methoxybenzhydrazide | Do. |
| 30 | [benzoxazole-C-CH=CH-C₆H₄-COOH] | Benzhydrazide | Phosphorus pentachloride. |
| 31 | [CH₃-benzoxazole-C-CH=CH-C₆H₄-COOH] | ...do | Do. |

TABLE II—Continued

| Ex. | I | II | III |
|---|---|---|---|
| 32 | CH₃O-[benzoxazole]-C-CH=CH-[phenyl]-COOH | Benzhydrazide | Phosphorus pentachloride. |
| 33 | [benzimidazole NH]-C-CH=CH-[phenyl]-COOH | ...do... | Do. |
| 34 | H₅C₂OOC-[benzoxazole]-C-CH=CH-[phenyl]-COOH | ...do... | Polyphosphoric acid. |
| 35 | H₅C₂O₂S-[benzoxazole]-C-CH=CH-[phenyl]-COOH | P-methylbenzhydrazide | Thionyl chloride. |
| 36 | [N-CH₃ benzimidazole]-C-CH=CH-[phenyl]-COOH | P-isobutylbenzhydrazide | Do. |
| 37 | Cl-[benzothiazole]-C-CH=CH-[phenyl]-COOH | Benzhydrazide | Do. |
| 38 | [benzothiazole]-C-CH=CH-[phenyl]-COOH | P-methylbenzhydrazide | Do. |

| Ex. | IV | $F_{max}$ (0.000025 g./l. dioxane), mμ | Observed C | Observed N | Calc'd. C | Calc'd. N |
|---|---|---|---|---|---|---|
| 21 | [benzoxazole]-C-CH=CH-[phenyl]-[oxadiazole]-[phenyl] | 408 | 75.53 | 11.70 | 75.60 | 11.50 |
| 22 | [benzimidazole NH]-C-CH=CH-[phenyl]-[oxadiazole]-[phenyl-Cl] | 426 | 69.20 | 14.12 | 69.27 | 14.05 |
| 23 | Cl-[benzoxazole]-C-CH=CH-[phenyl]-[oxadiazole]-[phenyl] | 416 | 69.02 | 10.60 | 69.07 | 10.51 |
| 24 | C₂H₅O-[benzoxazole]-C-CH=CH-[phenyl]-[oxadiazole]-[phenyl] | 417 | 73.30 | 10.28 | 73.33 | 10.26 |
| 25 | CH₃-[benzoxazole]-C-CH=CH-[phenyl]-[oxadiazole]-[pyridyl] | 423 | 75.35 | 11.51 | 75.40 | 11.47 |

TABLE III—Continued

| Ex. | IV | $F_{max.}$ (0.000025 g/l. dioxane), mμ | Elementary Analysis, percent | | | |
|---|---|---|---|---|---|---|
| | | | Observed | | Calc'd | |
| | | | C | N | C | N |
| 26 | | 430 | 78.30 | 9.76 | 78.31 | 9.77 |
| 27 | | 410 | 69.00 | 10.58 | 69.07 | 10.51 |
| 28 | | 426 | 73.10 | 8.9 | 73.19 | 8.83 |
| 29 | | 434 | 75.43 | 9.44 | 75.41 | 9.43 |
| 30 | | 416 | 72.39 | 11.10 | 72.43 | 11.02 |
| 31 | | 423 | 72.78 | 10.70 | 72.89 | 10.63 |
| 32 | | 425 | 70.00 | 10.26 | 70.06 | 10.21 |
| 33 | | 436 | 72.63 | 14.69 | 72.61 | 10.73 |
| 34 | | 418 | 71.31 | 9.70 | 71.38 | 9.61 |
| 35 | | 413 | 66.18 | 8.98 | 66.23 | 8.91 |
| 36 | | 434 | 77.33 | 12.97 | 77.39 | 12.90 |
| 37 | | 426 | 66.37 | 10.18 | 66.42 | 10.10 |

TABLE III.—Continued

| Ex. | IV | F$_{max.}$ (0.000025 g/l. dioxane), mµ | Elementary Analysis, percent | | | |
|---|---|---|---|---|---|---|
| | | | Observed | | Calc'd | |
| | | | C | N | C | N |
| 38 | [structure: benzothiazole-CH=CH-phenyl-oxadiazole-phenyl-CH₃] | 430 | 72.80 | 10.66 | 72.89 | 10.63 |

TABLE IV

| Example | I | II |
|---|---|---|
| 44 | NH–⌬–CH=CH–C(=N)–O–C(=N)–⌬–CH₃ | 5-aminoacenaphthene. |
| 45 | Same as above | 5-amino-3-methyl-1-phenylpyrazole. |
| 46 | H₂N–⌬–CH=CH–C(=N)–O–C(=N)–⌬ | 4-amino-2-methoxy toluene. |
| 47 | Same as above | 5-aminoacenaphthene. β-naphthylamine. |
| 48 | H₂N–⌬–CH=CH–C(=N)–O–C(=N)–⌬–Cl | |
| 49 | H₂N–⌬–CH=CH–C(=N)–S–C(=N)–⌬ | 4-amino-2-methoxy toluene. |
| 50 | H₂N–⌬–CH=CH–C(=N)–O–C(=N)–⌬ | 2-aminonaphthalene-4-sulfonic acid. |
| 51 | H₂N–⌬–CH=CH–C(=N)–O–C(=N)–⌬–C(CH₃)₃ | 2-aminonaphthalene-6-sulfonic acid. |
| 52 | H₂N–⌬–CH=CH–C(=N)–O–C(=N)–⌬–OCH₃ | 2-aminonaphthalene-7-sulfonic acid. |
| 53 | H₂N–⌬–CH=CH–C(=N)–O–C(=N)–⌬ | 2-aminonaphthalene-8-sulfonic acid. |
| 54 | Same as above | 2-aminonaphthalene-6,8-disulfonic acid. |
| 55 | Same as above | 2-aminonaphthalene-5-sulfonic acid. |

| Example | III | F$_{max.}$ (0.000025 g./l. dioxane), mµ | Elementary analysis, percent | | | |
|---|---|---|---|---|---|---|
| | | | Observed | | Calcd. | |
| | | | C | N | C | N |
| 44 | [structure with fused ring system-N-phenyl-CH=CH-oxadiazole-phenyl-CH₃] | 426 | 76.37 | 15.41 | 76.40 | 15.38 |
| 45 | [H₃C-C=N-triazole-N-phenyl-CH=CH-oxadiazole-phenyl-CH₃ with phenyl substituent] | 423 | 70.56 | 21.40 | 70.58 | 21.34 |

TABLE IV—Continued

| Example III | | F_max. (0.000025 g/l. dioxane), mμ | Elementary Analysis, percent | | | |
|---|---|---|---|---|---|---|
| | | | Observed | | Calc'd | |
| | | | C | N | C | N |
| 46 | [structure: CH₃O, CH₃ substituted bicyclic with N=N-C(=N-N=)-O ring, linked via N–C₆H₄–CH=CH–C(oxadiazole)–C₆H₅] | 417 | 70.39 | 17.16 | 70.40 | 17.11 |
| 47 | [structure: CH₂–CH₂ bridged bicyclic diazine linked to phenyl–CH=CH–oxadiazole–phenyl] | 424 | 76.10 | 15.96 | 76.17 | 15.87 |
| 48 | [structure: fused bicyclic diazine linked to phenyl–CH=CH–oxadiazole–phenyl–Cl] | 421 | 69.38 | 15.61 | 69.41 | 15.56 |
| 49 | [structure: CH₃O, CH₃ substituted bicyclic diazine linked to phenyl–CH=CH–thiadiazole–phenyl] | 424 | 67.70 | 16.51 | 67.74 | 16.46 |
| 50 | [structure: triazole-fused bicyclic with HO₃S, linked to phenyl–CH=CH–oxadiazole–phenyl] | [1] 416 | | | | |
| 51 | [structure: HO₃S-substituted triazole-fused bicyclic linked to phenyl–CH=CH–oxadiazole–phenyl–C(CH₃)₃] | [1] 418 | | | | |
| 52 | [structure: HO₃S-substituted triazole-fused bicyclic linked to phenyl–CH=CH–oxadiazole–phenyl–OCH₃] | [1] 420 | | | | |
| 53 | [structure: HO₃S-substituted triazole-fused bicyclic linked to phenyl–CH=CH–oxadiazole–phenyl] | [1] 421 | | | | |
| 54 | [structure: di-HO₃S-substituted triazole-fused bicyclic linked to phenyl–CH=CH–oxadiazole–phenyl] | [1] 419 | | | | |

See footnote at end of table.

TABLE IV—Continued

| Example III | | Fmax. (0.000025 g/l. dioxane), mμ | Elementary Analysis, percent | | | |
|---|---|---|---|---|---|---|
| | | | Observed | | Calc'd | |
| | | | C | N | C | N |
| 55 | 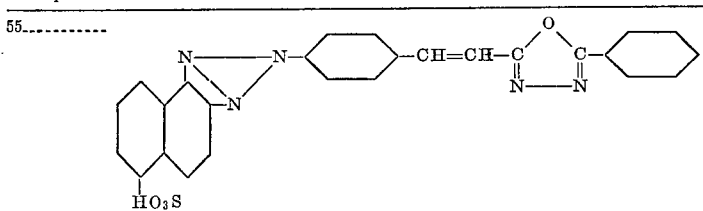 | [1] 417 | | | | |

[1] 0.000025 g./l. aqueous solution.

What is claimed is:

1. A compound represented by the following formula:

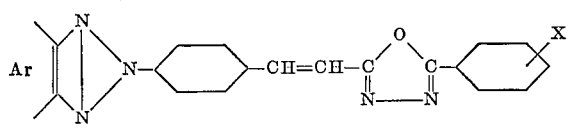

wherein Ar is a benzene nucleus substituted by sulfonic acid or by a methyl and methoxy group; a naphthalene nucleus or an acenaphthene nucleus, and X is hydrogen, methyl or chlorine.

2. A compound of claim 1, which is represented by the formula:

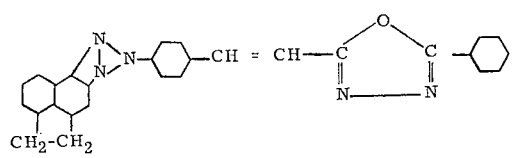

3. A compound of claim 1, which is represented by the formula:

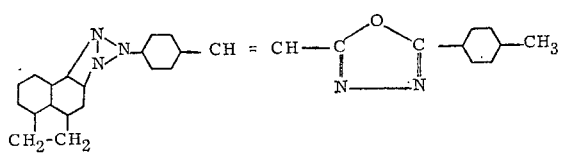

4. A compound of claim 1, which is represented by the formula

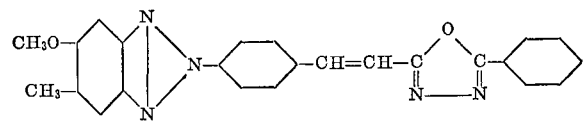

5. A compound of claim 4, which is represented by the formula

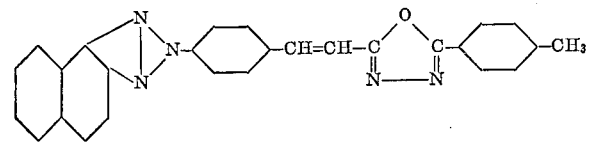

6. A compound of claim 1, which is represented by the formula

7. A compound of claim 1, which is represented by the formula

8. A compound of claim 1, which is represented by the formula

9. A compound of claim 1, which is represented by the formula

References Cited

UNITED STATES PATENTS 2,765,304  10/1956  Siegrist et al. _____ 260—240
3,401,048  9/1968   Okubo et al. _____ 260—240 X JOHN D. RANDOLPH, Primary Examiner U.S. Cl. X.R.

106—176; 117—33.5 T; 252—301.2 W; 260—75 T, 77.5 D, 78 SC, 88.7 R, 92.8 A & R, 93.5 A & R, 141, 157, 240 D & J, 306.8 D, 307 R & G, 469, 471, 558 H